(12) United States Patent
Kao et al.

(10) Patent No.: US 11,415,830 B2
(45) Date of Patent: Aug. 16, 2022

(54) ELECTRONIC DEVICE

(71) Applicant: InnoLux Corporation, Miao-Li County (TW)

(72) Inventors: Chen-Kuan Kao, Miao-Li County (TW); Ta-Ching Chen, Miao-Li County (TW); Wei-Ming Kao, Miao-Li County (TW); Chih-Chang Hou, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 5 days.

(21) Appl. No.: 17/120,619

(22) Filed: Dec. 14, 2020

(65) Prior Publication Data

US 2021/0208451 A1 Jul. 8, 2021

(30) Foreign Application Priority Data

Jan. 6, 2020 (CN) .......................... 202010010513.6

(51) Int. Cl.
*G02F 1/1335* (2006.01)
*G02F 1/1337* (2006.01)
*G02F 1/1339* (2006.01)

(52) U.S. Cl.
CPC ...... *G02F 1/133514* (2013.01); *G02F 1/1337* (2013.01); *G02F 1/13394* (2013.01); *G02F 1/13396* (2021.01); *G02F 1/133512* (2013.01)

(58) Field of Classification Search
CPC ............. G02F 1/13394; G02F 1/13396; G02F 1/133514; G02F 1/133512
See application file for complete search history.

(56) References Cited

U.S. PATENT DOCUMENTS

| | | | |
|---|---|---|---|
| 2001/0026347 A1 | 10/2001 | Sawasaki et al. | |
| 2004/0125279 A1* | 7/2004 | Lee ................... | G02F 1/133512 349/110 |
| 2007/0064178 A1 | 3/2007 | Murai | |
| 2011/0080543 A1 | 4/2011 | Kohara et al. | |
| 2012/0309120 A1 | 12/2012 | Takahashi et al. | |
| 2012/0327337 A1* | 12/2012 | Waratani ........... | G02F 1/133514 349/106 |
| 2016/0291369 A1 | 10/2016 | Park et al. | |

* cited by examiner

*Primary Examiner* — Jessica M Merlin
(74) *Attorney, Agent, or Firm* — McClure, Qualey & Rodack, LLP

(57) ABSTRACT

An electronic device is provided. The electronic device includes a first substrate, a second substrate, a light-shielding layer, and a color filter layer. The second substrate is disposed opposite to the first substrate. The light-shielding layer is disposed on the second substrate and includes an opening area and a light-shielding area. The color filter layer is disposed on the second substrate and includes a first color filter unit. The first color filter unit includes a first portion and a second portion. In addition, the first portion is at least partially overlapped with the opening area, the second portion is overlapped with the light-shielding area, and there is a first gap between the first portion and the second portion.

7 Claims, 7 Drawing Sheets

ELECTRONIC DEVICE

CROSS REFERENCE TO RELATED APPLICATIONS

This application claims priority of China Patent Application No. 202010010513.6, filed on Jan. 6, 2020, the entirety of which is incorporated by reference herein.

BACKGROUND

Technical Field

The present disclosure relates to an electronic device, and in particular it relates to an electronic device including a patterned design color filter layer.

Description of the Related Art

Electronic products equipped with display panels, such as smartphones, tablet computers, notebook computers, displays, and televisions, have become indispensable necessities in modern society. With the flourishing development of these portable electronic products, consumers have high expectations regarding their quality, functionality, and price. Due to the advantages of lightness and thinness, low power consumption, and good image quality, liquid-crystal displays have been widely used in various electronic devices.

Although existing liquid-crystal displays are substantially adequate for their intended use, they have not yet met consumer expectations in various aspects. For example, they still have problems such as uneven brightness and dark shadows. Therefore, the development of a structural design that can further improve the quality or performance of the liquid-crystal displays is still one of the current research topics in the industry.

SUMMARY

In accordance with some embodiments of the present disclosure, an electronic device is provided. The electronic device includes a first substrate, a second substrate, a light-shielding layer, and a color filter layer. The second substrate is disposed opposite to the first substrate. The light-shielding layer is disposed on the second substrate and includes an opening area and a light-shielding area. The color filter layer is disposed on the second substrate and includes a first color filter unit. The first color filter unit includes a first portion and a second portion. In addition, the first portion is at least partially overlapped with the opening area, the second portion is overlapped with the light-shielding area, and there is a first gap between the first portion and the second portion.

In accordance with some embodiments of the present disclosure, an electronic device is provided. The electronic device includes a first substrate, a second substrate, a main spacer, a sub-spacer, a light-shielding layer, a color filter layer, and an alignment layer. The second substrate is disposed opposite to the first substrate. The main spacer is disposed on the first substrate. The sub-spacer is disposed on the first substrate and adjacent to the main spacer. The light-shielding layer is disposed on the second substrate. The color filter layer is disposed on the second substrate and is partially overlapped with the light-shielding layer. The alignment layer is disposed on the color filter layer. In addition, a thickness of the alignment layer that is over-lapped with the main spacer is smaller than a thickness of the alignment layer that is overlapped with the sub-spacer.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
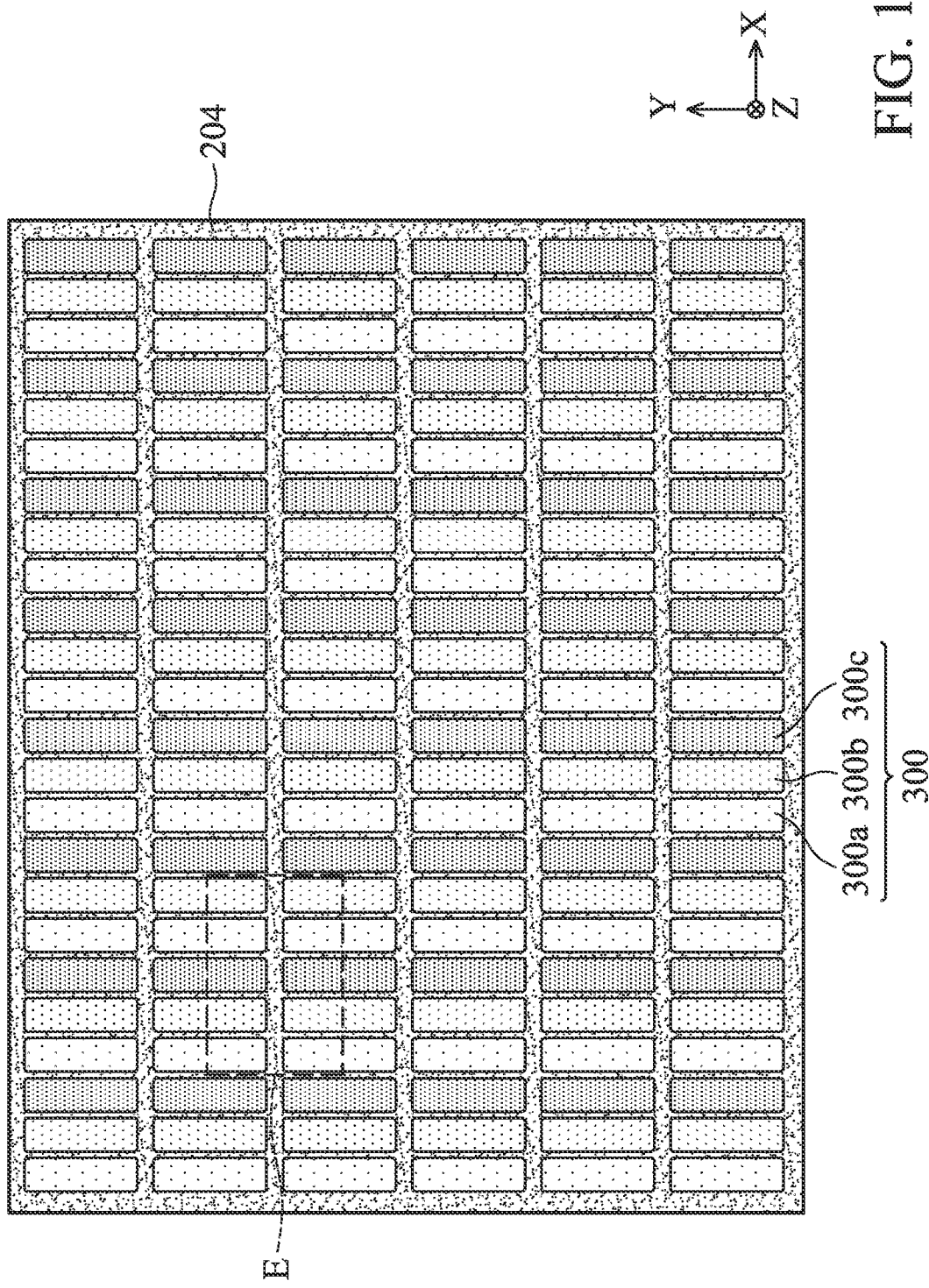
FIG. 1 is a top-view diagram of an electronic device in accordance with some embodiments of the present disclosure.

The electronic device of the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. The embodiments are used merely for the purpose of illustration and the present disclosure is not limited thereto. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those with ordinary skill in the art. In addition, in the embodiments, relative expressions are used. For example, "lower", "bottom", "higher" or "top" are used to describe the position of one element relative to another. It should be appreciated that if a device is flipped upside down, an element that is "lower" will become an element that is "higher". The present disclosure can be understood by referring to the following detailed description in connection with the accompanying drawings. It should be understood that the drawings are not drawn to scale. In fact, the size of the element may be arbitrarily enlarged or reduced in order to clearly show the features of the present disclosure.

Moreover, the expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, it should be understood that, although the terms "first", "second", "third" etc. may be used herein to describe various elements, components, or portions, these elements, components, or portions should not be limited by these terms. These terms are only used to distinguish one element, component, or portion from another element, component, or portion. Thus, a first element, component, or portion discussed below could be termed a second element, component, or portion without departing from the teachings of the present disclosure.

The terms "about" and "substantially" mean+/−10%, +/−5%, +/−3%, +/−2%, +/−1%, or +/−0.5% of the stated value. The stated value of the present disclosure is an approximate value. When there is no specific description, the stated value includes the meaning of "about" or "substantially". In addition, the term "in a range from the first value to the second value" means that the range includes the first value, the second value, and other values in between.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

The technical features in different embodiments described in the following can be replaced, recombined, or mixed with one another to constitute another embodiment without departing from the spirit of the present disclosure.

In accordance with some embodiments of the present disclosure, an electronic device is provided. The electronic device may include a color filter layer with a patterned design, thereby reducing the height difference between color filter units of different colors. The thickness of the alignment layer that is overlapped with the main spacer can be reduced, thereby reducing the alignment layer being worn by the main spacer and generating debris. In accordance with some embodiments of the present disclosure, the provided electronic device can improve the problems such as brightness unevenness (mura), bright spots or dark shadows of the panel.

In accordance with some embodiments of the present disclosure, the electronic device may include a display device, a sensing device, or a tiled device, but it is not limited thereto. The electronic device can be a bendable or flexible electronic device. The electronic device may, for example, include a liquid-crystal display device. In accordance with some embodiments, the liquid-crystal display device may include a backlight module. The backlight module may include light-emitting diodes, such as inorganic light-emitting diodes, organic light-emitting diodes (OLED), mini light-emitting diodes (mini LED), and micro light-emitting diode (micro LED), or quantum dot light-emitting diode (for example, QLED or QDLED), fluorescence, phosphor, or other suitable materials, or a combination thereof, but it is not limited thereto. The tiled device may be, for example, a tiled display device, but it is not limited thereto. The electronic device can be any combination of the foregoing, but it is not limited thereto. It should be understood that the display device will be used as an example to describe the electronic device of the present disclosure in the following context, but the present disclosure is not limited thereto.

Referring to FIG. 1, which is a top-view diagram of an electronic device 10 in accordance with some embodiments of the present disclosure. It should be understood that, for clarity, some elements of the electronic device 10 are omitted in the drawing, and only the color filter layer 300 and the light-shielding layer 204 of the electronic device 10 are schematically shown. In accordance with some embodiments, additional features can be added to the electronic device 10 described below. In accordance with some other embodiments, part of the features of the electronic device 10 described below may be replaced or omitted.

As shown in FIG. 1, the electronic device 10 may include a color filter layer 300 and a light-shielding layer 204. In accordance with some embodiments, the light-shielding layer 204 may include a black matrix or other suitable light-shielding material(s), but it is not limited thereto, and when viewed from the light-emitting surface of the electronic device 10, the light-shielding layer 204 may have a plurality of openings, and the color filter layer 300 may be overlapped with the openings of the light-shielding layer 204. The color filter layer 300 may filter or adjust the optical properties of the light passing through it, for example, to render light in a specific wavelength range passing through it. In accordance with some embodiments, the electronic device 10 may include a plurality of scan lines (not illustrated) and a plurality of data lines (not illustrated). The scan lines may extend substantially along the X direction, and the data lines may substantially extend along the Y direction. The scan lines and the data lines may be overlapped with the light-shielding layer 204, but they are not limited thereto. In accordance with embodiments of the present disclosure, unless stated otherwise, the term "overlap" can refer to partially overlap and entirely overlap.

In accordance with some embodiments, the color filter layer 300 may include a plurality of color filter units, for example, color filter units 300a, color filter units 300b, and color filter units 300c. For example, in accordance with some embodiments, the color filter unit 300a, the color filter unit 300b, and the color filter unit 300c may be a red filter unit, a green filter unit, and a blue filter unit, respectively, but the present disclosure is not limited thereto. In addition, it should be understood that, although the color filter layer 300 includes three color filter units in the embodiment shown in the drawings, the color filter layer 300 may include other suitable numbers of color filter units or include color filter units having other suitable colors in accordance with some other embodiments.

In accordance with some embodiments, the material of the color filter layer 300 may include a color photoresist, and the material of the color photoresist, for example, may include a polymer material and pigments or photosensitive materials dispersed therein. In accordance with some embodiments, the aforementioned polymer material may include epoxy resin, acrylic resin such as polymethylmethacrylate (PMMA), benzocyclobutene (BCB), other suitable materials, or a combination thereof, but it is not limited thereto. In accordance with some embodiments, the material of the light-shielding layer 204 may include black photoresist, black printing ink, black resin, metal, carbon black material, resin material, photosensitive material, other suitable materials, or a combination thereof, but it is not limited thereto.

Figure 3:
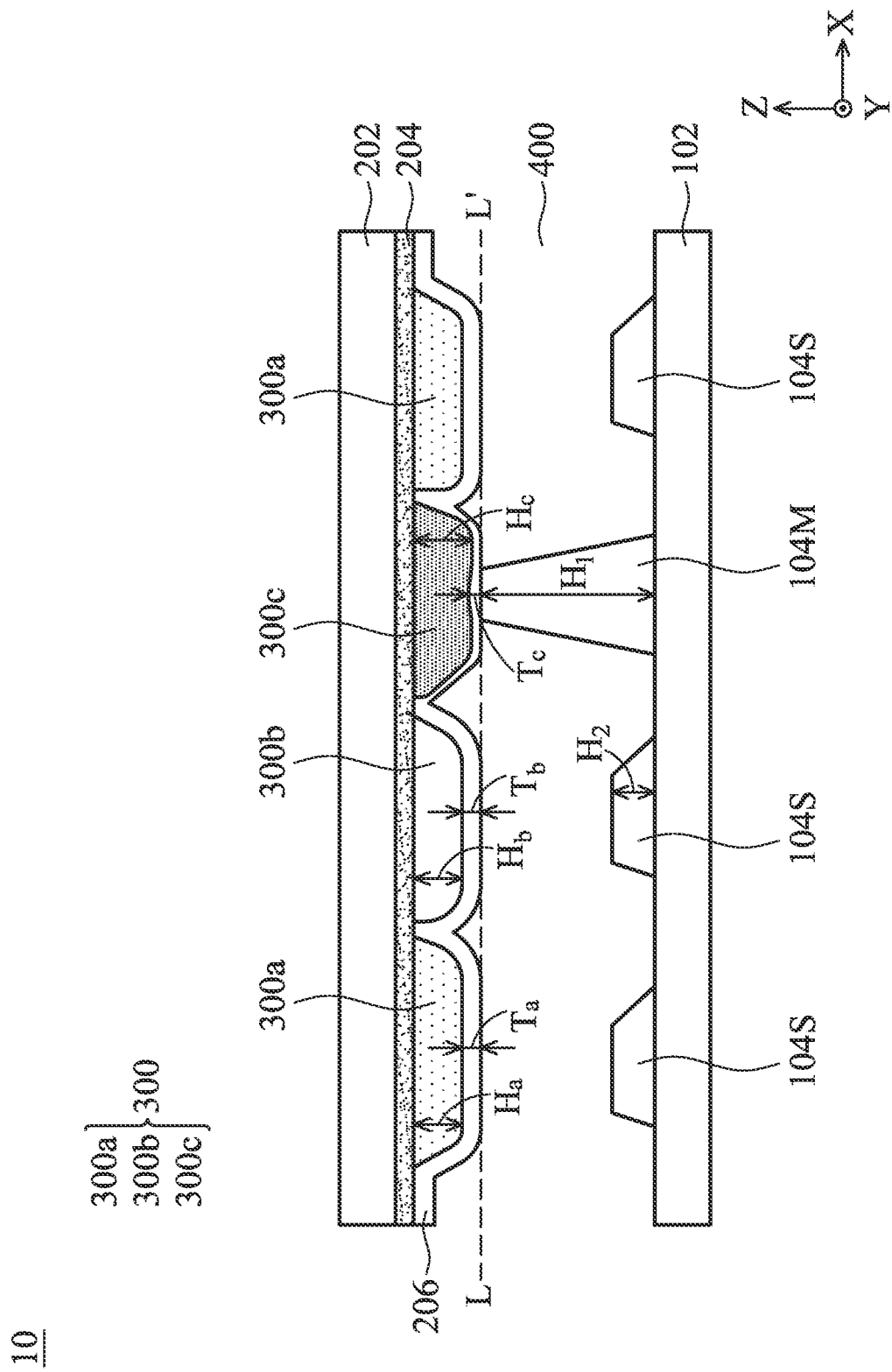
FIG. 3 is a cross-sectional diagram of an electronic device taken along section line A-A' in FIG. 2B in accordance with some embodiments of the present disclosure.

In accordance with some embodiments, the color filter layer 300 and the light-shielding layer 204 may be formed by a coating process, a deposition process, a printing process, an evaporation process, a sputtering process, other suitable processes, or a combination thereof. In accordance with some embodiments, the light-shielding layer 204 may be formed on the substrate 202 (as shown in FIG. 3) first, and then the color filter layer 300 may be formed on the substrate 202, but the present disclosure is not limited thereto.

In addition, in accordance with some embodiments, the color filter layer 300 and the light-shielding layer 204 may be patterned to have suitable shapes and profiles by a photolithography process and/or an etching process. In accordance with some embodiments, the photolithography process may include photoresist coating (such as spin coating), soft baking, hard baking, mask alignment, exposure, post-exposure baking, photoresist development, cleaning and drying, etc., but it is not limited thereto. The etching process may include a dry etching process or a wet etching process, but it is not limited thereto.

Figure 2B:
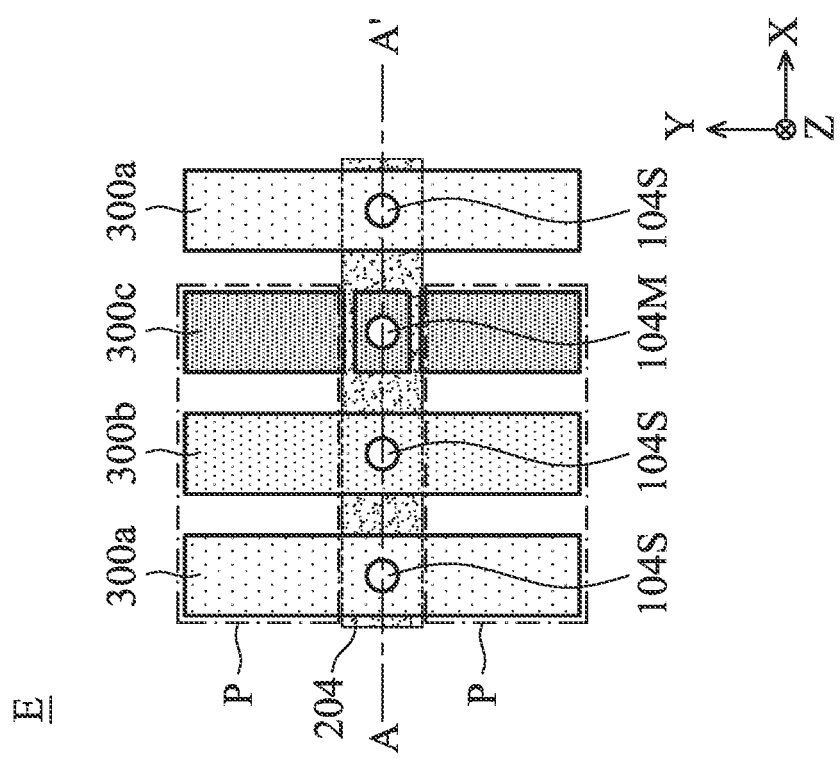
FIG. 2A and FIG. 2B are enlarged diagrams of a region E in FIG. 1 in accordance with some embodiments of the present disclosure.
Figure 2A:
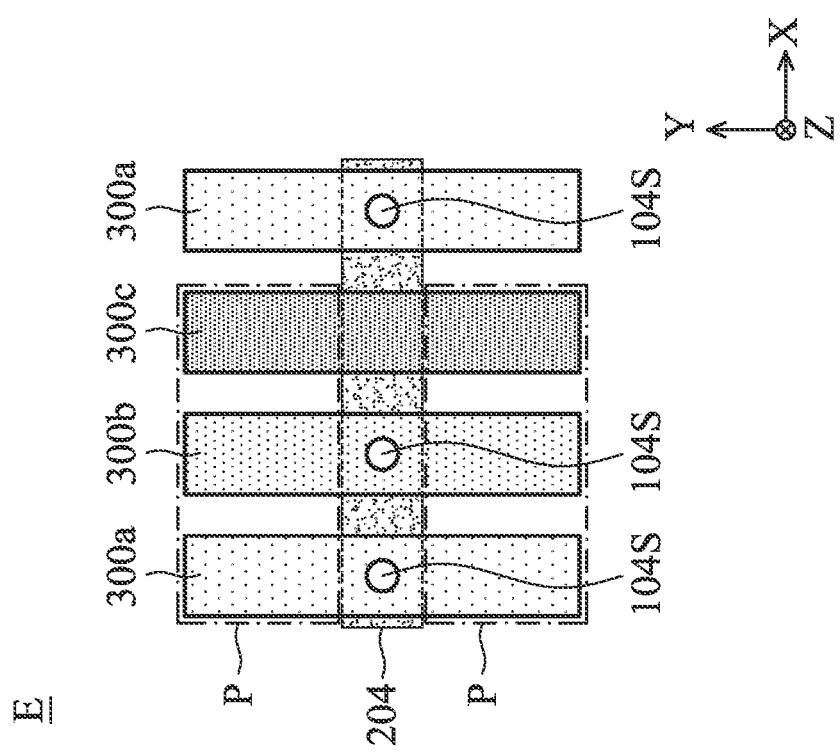

Next, referring to FIG. 2A and FIG. 2B, which are enlarged diagrams of a region E in FIG. 1 in accordance with some embodiments of the present disclosure. FIG. 2A and FIG. 2B are schematic diagrams viewed from the backlight surface of the electronic device 10. It should be understood that only a part of the light-shielding layer 204 (the part extending along the X direction in the drawing) is shown in FIG. 2A and FIG. 2B, and the light-shielding layer 204 below the color filter layer 300 is marked with a dotted line to clearly illustrate their positional relationship.

As shown in FIG. 2A and FIG. 2B, in accordance with some embodiments, the color filter layer 300 may be partially overlapped with the light-shielding layer 204 in a normal direction of the light-shielding layer 204 (for example, the Z direction shown in the drawing). In accordance with some embodiments, the electronic device 10 may include a plurality of spacers. For example, the spacers may include a main spacer 104M (shown in FIG. 2B) and a sub-spacer 104S. The main spacer 104M and the sub-spacer 104S may be disposed between a substrate 102 and a substrate 202 (as shown in FIG. 3) of the electronic device 10 to maintain the cell gap between the substrate 102 and the substrate 202 or may improve the structural strength of the electronic device 10.

In accordance with some embodiments, the main spacer 104M and the sub-spacer 104S may be disposed between two adjacent pixels P of the electronic device 10, such as the area (i.e. light-shielding area) of the light-shielding layer 204 indicated in FIG. 2A and FIG. 2B. FIG. 2A and FIG. 2B only illustrate that one pixel P may include three sub-pixels, but the present disclosure is not limited thereto. The pixel P may include more or less sub-pixels as required in accordance with some other embodiments. In accordance with some embodiments, in the normal direction of the light-shielding layer 204 (for example, the Z direction shown in the drawing), the main spacer 104M and the sub-spacer 104S may be overlapped with the color filter layer 300, or the main spacer 104M and the sub-spacer 104S may be overlapped with the light-shielding layer 204.

As shown in FIGS. 2A and 2B, in accordance with some embodiments, the sub-spacers 104S may be overlapped with the color filter unit 300a and the color filter unit 300b. In accordance with some embodiments, neither the sub-spacers 104S nor the main spacer 104M may overlap the color filter unit 300c (as shown in FIG. 2A). In accordance with some embodiments, the main spacer 104M may be overlapped with the color filter unit 300c (as shown in FIG. 2B). In accordance with some embodiments, the color filter unit 300c may be a blue filter unit, but it is not limited thereto.

In accordance with some embodiments, the materials of the main spacer 104M and the sub-spacer 104S may include organic materials. In accordance with some embodiments, the aforementioned organic material may include epoxy resin, acrylic resin such as polymethylmethacrylate (PMMA), benzocyclobutene (BCB), polyethylene terephthalate (polyethylene terephthalate, PET), polyethylene (PE), polyethersulfone (PES), polycarbonate (PC), other suitable materials, or a combination thereof, but it is not limited thereto.

In accordance with some embodiments, the main spacer 104M and the sub-spacer 104S may be formed by a coating process, a deposition process, a printing process, other suitable processes, or a combination thereof. In accordance with some embodiments, the main spacer 104M and the sub-spacer 104S may be patterned by a photolithography process and/or an etching process.

In addition, in the electronic device 10, the configuration of the color filter layer 300, the main spacer 104M and the sub-spacers 104S may be partly as shown in FIG. 2A, and partly as shown in FIG. 2B. In accordance with some embodiments, a configuration ratio of the color filter units 300c overlapping the main spacer 104M may account for about one-sixteenth (1/16) to about one-twenty sixth (1/36) of all the color filter units 300c. For example, about one-twenty fourth (1/24), but the present disclosure is not limited thereto.

It should be noted that, in accordance with some embodiments, the color filter unit 300c that is overlapped with the main spacer 104M may have a specific patterned design, which will be described in detail in FIGS. 4A to 4G below.

Next, referring to FIG. 3, which is a cross-sectional diagram of the electronic device 10 taken along section line A-A' in FIG. 2B in accordance with some embodiments of the present disclosure. As shown in FIG. 3, the electronic device 10 may include the substrate 102 and the substrate 202, and the substrate 202 is disposed opposite to the substrate 102. The main spacer 104M and the sub-spacer 104S may be disposed between the substrate 102 and the substrate 202, for example, may be disposed on the substrate 102. The sub-spacer 104S may be adjacent to the main spacer 104M. The light-shielding layer 204 and the color filter layer 300 may be disposed on the substrate 202.

In accordance with some embodiments, the substrate 102 may serve as a driving substrate of the electronic device 10, and the substrate 202 may serve as a color filter substrate. Specifically, in accordance with some embodiments, the substrate 102 may further include a driving circuit (not illustrated) disposed therein, but it is not limited thereto. The driving circuit may include, for example, an active driving circuit and/or a passive driving circuit. In accordance with some embodiments, the driving circuit may include a transistor (for example, a switching transistor or a driving transistor, etc.), a data line, a scan line, a conductive pad, a dielectric layer or other circuits, etc., but it is not limited thereto. The switching transistor may be used to control the switching of the pixel P. In accordance with some embodiments, the driving circuit may control the pixel P of the electronic device 10 through an external integrated circuit (IC) or a microchip, but it is not limited thereto. In addition, in accordance with some embodiments, the substrate 102 and the substrate 202 may further include an electrode layer (not illustrated) formed therein, and the electrode layer may be coupled to the aforementioned driving circuit.

The substrate 102 and the substrate 202 may include a flexible substrate, a rigid substrate, or a combination thereof. In accordance with some embodiments, the materials of the substrate 102 and the substrate 202 may include glass, quartz, sapphire, ceramic, polyimide (PI), liquid-crystal polymer (LCP) material, polycarbonate (PC), photosensitive polyimide (PSPI), polyethylene terephthalate (PET), other suitable materials, or a combination thereof, but it is not limited thereto. In accordance with some embodiments, the substrate 102 may include a printed circuit board (PCB). In addition, the material of the substrate 102 may be the same as or different than the material of the substrate 202.

As shown in FIG. 3, in accordance with some embodiments, in the normal direction of the substrate 102 or the substrate 202 (for example, the Z direction shown in the drawing), the main spacer 104M may be overlapped with the color filter unit 300c, the sub-spacer 104S may be overlapped with the color filter unit 300a or the color filter unit 300b, but it is not limited thereto. In accordance with some embodiments, the number of the sub-spacer 104S can be adjusted according to needs. In addition, a height $H_1$ of the main spacer 104M may be greater than a height $H_2$ of the sub-spacer 104S. In accordance with some embodiments, the main spacer 104M may serve as a main support structure for maintaining the gap between the substrate 102 and the substrate 202. In accordance with some embodiments, the main spacer 104M may be in contact with the color filter unit 300c, for example, may be in indirect contact with the color filter unit 300c through the alignment layer 206. In accordance with some embodiments, the sub-spacer 104S may serve as a backup buffer structure for maintaining the gap between the substrate 102 and the substrate 202 when an external force is applied to the electronic device 10. In accordance with some embodiments, the sub-spacer 104S may be not in contact with the color filter unit 300a or the color filter unit 300b.

In accordance with some embodiments, the height $H_1$ and the height $H_2$ respectively refer to the maximum heights of the main spacer 104M and the sub-spacer 104S in the normal direction of the substrate 102 (for example, the Z direction shown in the drawing), i.e. the maximum heights from the tops of the main spacer 104M and the sub-spacer 104S to the surface of the substrate 102. In some embodiments, the maximum heights may be measured after the electronic device 10 is disassembled, and the main spacer 104M and the sub-spacer 104S may be disposed on one of the substrate 102 and the substrate 202, but it is not limited thereto.

In addition, in accordance with some embodiments of the present disclosure, an optical microscope (OM), a scanning electron microscope (SEM), a film thickness profiler ($\alpha$-step), an ellipsometer or another suitable method may be used to measure the thickness, height, or width of each element or the distance between elements. Specifically, in accordance with some embodiments, a scanning electron microscope may be used to obtain any cross-sectional image including the elements to be measured, and the thickness, height, or width of each of the elements, or the distance between the elements in the image can be measured.

Furthermore, as shown in FIG. 3, the electronic device 10 may include an alignment layer 206, and the alignment layer 206 may be disposed on the color filter layer 300. In accordance with some embodiments, the electronic device 10 may include a modulating material layer 400, and the alignment layer 206 may be disposed between the color filter layer 300 and the modulating material layer 400. In accordance with some embodiments, the alignment layer 206 may be conformally disposed on the color filter layer 300. It should be understood that, for the sake of brevity, the alignment layer 206 disposed on the substrate 102 is not illustrated in FIG. 3. However, in accordance with some embodiments, the alignment layer 206 may also be disposed on the substrate 102, and the alignment layer 206 may be conformally disposed on the sub-spacers 104S and the main spacer 104M.

The alignment layer 206 can assist in controlling the material properties (for example, dielectric properties or arrangement direction, etc.) of the modulating material layer 400, thereby controlling the display characteristics of the pixels P. In accordance with some embodiments, the material of the alignment layer 206 may include an organic material, an inorganic material, or a combination thereof. For example, the organic material may include polyimide (PI), poly (vinyl cinnamate) (PVCN), polymethylmethacrylate (PMMA), other photoreactive polymer materials, or a combination thereof, but it is not limited thereto. The inorganic material may include, for example, silicon dioxide ($SiO_2$), silicon carbide (SiC), glass, silicon nitride ($Si_3N_4$), aluminum oxide ($Al_2O_3$), cerium oxide ($CeO_2$), other inorganic materials with alignment functions, or a combination thereof, but it is not limited thereto.

In accordance with some embodiments, the alignment layer 206 may be formed by a coating process, a chemical deposition process, a printing process, other suitable processes, or a combination thereof.

In accordance with some embodiments, the modulating material layer 400 may include a liquid-crystal material or other suitable modulating materials, but it is not limited thereto. The liquid-crystal material may include nematic liquid crystal, smectic liquid crystal, cholesteric liquid crystal, blue phase liquid crystal, other suitable liquid-crystal materials, or a combination thereof, but it is not limited thereto. Furthermore, in accordance with some embodiments, the electronic device 10 may include a touch liquid-crystal display device. Alternatively, the electronic device 10 may include a twisted nematic (TN) type liquid-crystal display device, a super twisted nematic (STN) type liquid-crystal display device, a double layer super twisted nematic (DSTN) liquid-crystal display device, a vertical alignment (VA) liquid-crystal display device, an in-plane switching (IPS) liquid-crystal display device, a cholesteric liquid-crystal display device, a blue phase liquid-crystal display device, a fringe field switching (FFS) type liquid-crystal display device, other suitable liquid-crystal display devices, or a combination thereof.

In some embodiments where the modulating material layer 400 includes liquid-crystal materials, the liquid-crystal layer may be formed by one drop filling (ODF) before the substrate 102 and the substrate 202 are assembled, or the liquid-crystal materials may be filled by vacuum injection after the substrate 102 and the substrate 202 are assembled, but the present disclosure is not limited thereto.

As shown in FIG. 3, the color filter unit 300a may have a height of Ha, the color filter unit 300b may have a height of Hb, and the color filter unit 300c may have a height of Hc. In accordance with some embodiments, the height Ha, the height Hb, and the height Hc may be different from each other. In accordance with some embodiments, the height Hc of the color filter unit 300c may be greater than the height Ha of the color filter unit 300a, and the height Hc may be greater than the height Hb of the color filter unit 300b.

In accordance with some embodiments, the height Ha, the height Hb, and the height Hc respectively refer to the maximum heights of the color filter unit 300a, color filter unit 300b, and color filter unit 300c in the normal direction of the substrate 202 (for example, the Z direction as shown in the drawing).

In addition, in accordance with some embodiments, the thickness of the alignment layer 206 disposed on the color filter unit 300a, the color filter unit 300b, and the color filter unit 300c may be different. In accordance with some embodiments, the alignment layer 206 disposed between the sub-spacer 104S and the color filter unit 300a may have a thickness Ta, the alignment layer 206 disposed between the sub-spacer 104S and the color filter unit 300b may have a thickness Tb, and the alignment layer 206 disposed between the main spacer 104M and the color filter unit 300c may have a thickness Tc. In accordance with some embodiments, the thickness Tc may be less than one or both of the thickness Ta and the thickness Tb. In accordance with some embodiments, the thickness Tc of the alignment layer 206 that is overlapped with the main spacer 104M may be smaller than the thickness Ta and/or thickness Tb of the alignment layer 206 that are/is overlapped with the sub-spacer 104S. In accordance with some embodiments, the thickness Tc may be less than 800 angstroms (Å) (i.e. 0 Å<thickness Tc≤800 Å), such as 100 Å, 200 Å, 300 Å, 400 Å, 500 Å, 600 Å, or 700 Å, but it is not limited thereto.

In accordance with some embodiments, the thickness Ta may refer to the maximum thickness of the alignment layer 206 that is overlapped with the color filter unit 300a and the sub-spacer 104S in the normal direction of the substrate 202 (for example, the Z direction shown in the drawing). The thickness Tb may refer to the maximum thickness of the alignment layer 206 that is overlapped with the color filter unit 300b and the sub-spacer 104S in the normal direction of the substrate 202 (for example, the Z direction shown in the drawing). The thickness Tc may refer to the maximum thickness of the alignment layer 206 that is overlapped with the color filter unit 300c and the main spacer 104M in the normal direction of the substrate 202 (for example, the Z direction shown in the drawing).

Specifically, in accordance with some embodiments, the color filter unit 300a, the color filter unit 300b, and the color filter unit 300c are color filter units of different colors. The materials of color filter units of different colors may have different characteristics (for example, different heat resistance). Therefore, it is usually necessary to form color filter units of different colors in a specific order. For example, the blue color filter unit is generally manufactured in the last process to reduce the risk of deterioration due to its poor heat resistance. However, in this way, the formation space of the blue color filter unit is easily hindered by other adjacent color filter units that are formed first, and the edges of the blue color filter unit may have protruding portions higher than the adjacent color filter units. Therefore, the alignment layer may easily accumulate in the space enclosed by the protruding portions, causing the thickness of the alignment layer to be larger than the adjacent color filter unit(s).

However, in accordance with some embodiments of the present disclosure, through the patterned design of the color filter layer 300 (as shown in FIGS. 4A to 4G), the height difference between color filter units of different colors can be reduced. The alignment layer 206 is not easy to accumulate on a specific color filter unit (for example, the protruding portions of the blue color filter unit), so the problem that the alignment layer 206 is too thick on a specific color filter unit can be improved, thereby reducing the alignment layer 206 being worn by the main spacer 104M and generating debris. However, the material of the color filter layer 300 used in different types of products may also be different and have different properties. Therefore, the color filter unit 300c of the present disclosure is not limited to blue color filter unit. Those skilled in the art can understand that the foregoing only uses the blue color filter unit as an illustrative description.

In accordance with some embodiments of the present disclosure, the top surface of the alignment layer 206 disposed on the color filter layer 300 may be substantially flat. That is, the heights of the top surface of the alignment layer 206 disposed on the color filter layer 300 may be substantially the same (e.g., the horizontal height line segment L-L' as shown in the drawing), but it is not limited thereto. Specifically, in accordance with some embodiments, the height of the top surface of the alignment layer 206 (i.e. the height Ha plus the thickness Ta) disposed on the color filter unit 300a, the height of the top surface of the alignment layer 206 (i.e. the height Hb plus the thickness Tb) disposed on the color filter unit 300b and the height of the top surface of the alignment layer 206 (i.e. the height Hc plus the thickness Tc) disposed on the color filter unit 300c may be substantially the same. In accordance with some other embodiments, the alignment layer 206 on the color filter unit 300c that is overlapped with the main spacer 104M may be substantially flat, and there is no limitation in other places to be substantially flat, but the present disclosure is not limited thereto.

Next, referring to FIGS. 4A to 4G, which are enlarged diagrams of the region E in FIG. 1 in accordance with some other embodiments of the present disclosure. FIGS. 4A to 4G are schematic diagrams viewed from the backlight surface of the electronic device 10. FIGS. 4A to 4G show various aspects of the patterned design of the color filter layer 300 in accordance with some embodiments of the present disclosure. As shown in FIGS. 4A to 4G, the light-shielding layer 204 may include an opening area 204P and a light-shielding area 204S. It should be understood that, for the sake of brevity, only a part of the light-shielding areas 204S (the part extending along the X direction in the drawing) and a part of the opening areas 204P are marked in FIGS. 4A to 4G.

Figure 4B:
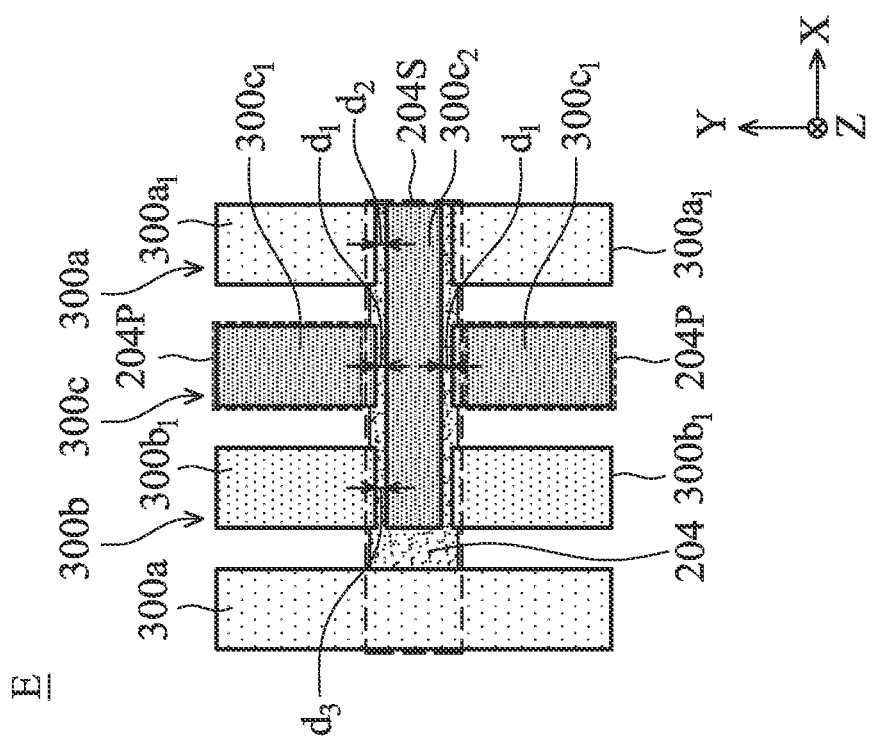
FIGS. 4A to 4G are enlarged diagrams of a region E in FIG. 1 in accordance with some embodiments of the present disclosure.
Figure 4A:
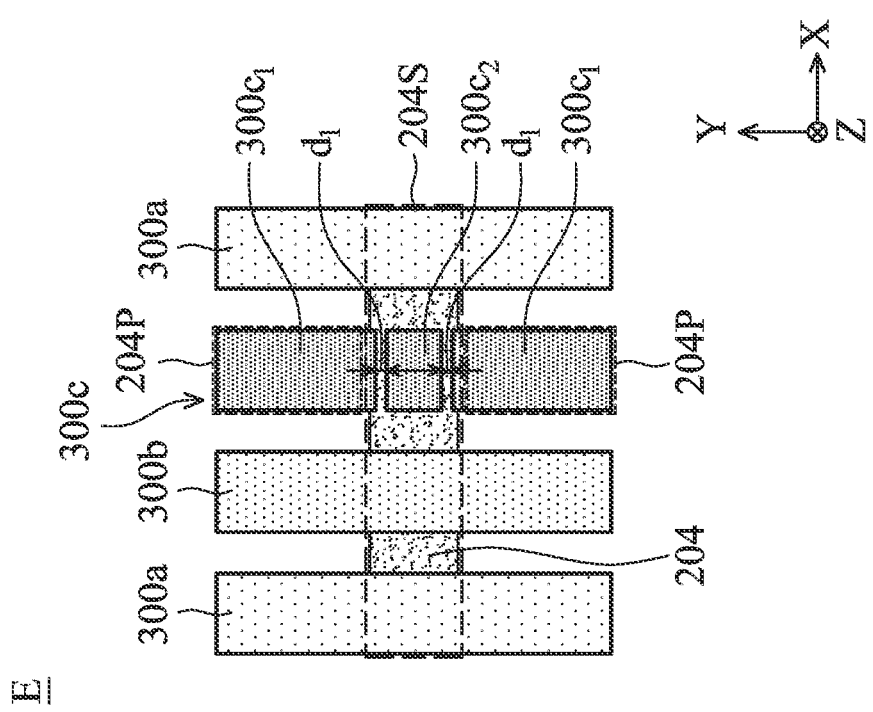

As shown in FIG. 4A, in accordance with some embodiments, the color filter unit 300c may be disposed between the color filter unit 300a and the color filter unit 300b, and the color filter unit 300c may be patterned to have discontinuous portions. In accordance with some embodiments, the color filter unit 300c may include a first portion $300c_1$ and a second portion $300c_2$. The first portion $300c_1$ and the second portion $300c_2$ may be at least partially overlapped with the opening areas 204P in the normal direction (for example, the Z direction shown in the drawing) of the substrate 202 (shown in FIG. 3). In addition, the second portion $300c_2$ may be overlapped with the light-shielding area 204S, and there may be a first gap $d_1$ between the first portion $300c_1$ and the second portion $300c_2$. In accordance with some embodiments, the second portion $300c_2$ may be entirely overlapped with the light-shielding area 204S, that is, the second portion $300c_2$ may be disposed in the light-shielding area 204S. In addition, in accordance with some embodiments, the second portion $300c_2$ may be separated from the adjacent first portions $300c_1$, the color filter unit 300a, and the color filter unit 300b, and the second portion $300c_2$ may be an island structure. In accordance with some embodiments, the first gap $d_1$ between the second portion $300c_2$ and two adjacent first portions $300c_1$ may be the same or different.

In accordance with some embodiments, the main spacer 104M (not illustrated) may be disposed between the second portion $300c_2$ and the substrate 102, and the main spacer 104M may be overlapped with the second part $300c_2$. In accordance with some embodiments, the main spacer 104M may be in contact with the second portion $300c_2$ of the color filter unit 300c, for example, the main spacer 104M may be in indirect contact with the second portion $300c_2$ through the alignment layer (not illustrated).

It should be understood that, in accordance with some embodiments, although the first portion $300c_1$ is slightly overlapped with the light-shielding area 204S, the first portion $300c_1$ is mainly overlapped with the opening areas 204P, and the first portion $300c_1$ may be larger than the corresponding opening area 204P. For example, an overlapping ratio of the first portion $300c_1$ to the opening area 204P may be about 80% or more, about 85% or more, or about 90% or more of the total area of the first portion $300c_1$.

Next, referring to FIG. 4B, in accordance with some embodiments, the second portion $300c_2$ of the color filter unit 300c may penetrate through the color filter unit 300a and/or the color filter unit 300b adjacent to the color filter unit 300c. For example, the second portion $300c_2$ of the color filter unit 300c may be disposed between the two first portions $300a_1$ of the color filter unit $300a_1$, and/or the second portion $300c_2$ may be disposed between the two first portions $300b_1$ of the color filter unit 300b. In accordance with some embodiments, the color filter unit 300a and/or the color filter unit 300b may also be patterned to have discontinuous portions. In accordance with some embodiments, the color filter unit 300a may include two separated first portions $300a_1$, and the color filter unit 300b may include two separated first portions $300b_1$. In accordance with some embodiments, the second portion $300c_2$ of the color filter unit 300c may be separated from the adjacent first portions $300c_1$, first portions $300a_1$, and first portions $300b_1$. The second portion $300c_2$ may be an island-shaped structure, for example, an elongated island-shaped structure. In accordance with some embodiments, there may be a second gap $d_2$ between the second portion $300c_2$ and the first portion $300a_1$ of the color filter unit 300a, and there may be a third gap $d_3$ between the second portion $300c_2$ and the first portion $300b_1$ of the color filter unit 300b. In accordance with some embodiments, the second gap $d_2$ and the third gap $d_3$ may be the same as or different than the aforementioned first gap $d_1$.

Figure 4D:
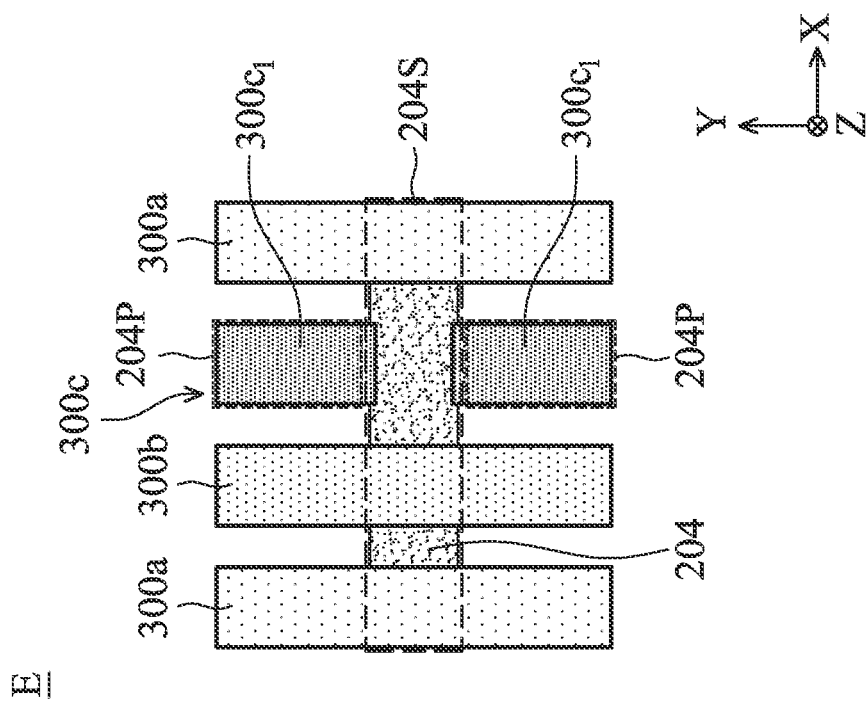
Figure 4C:
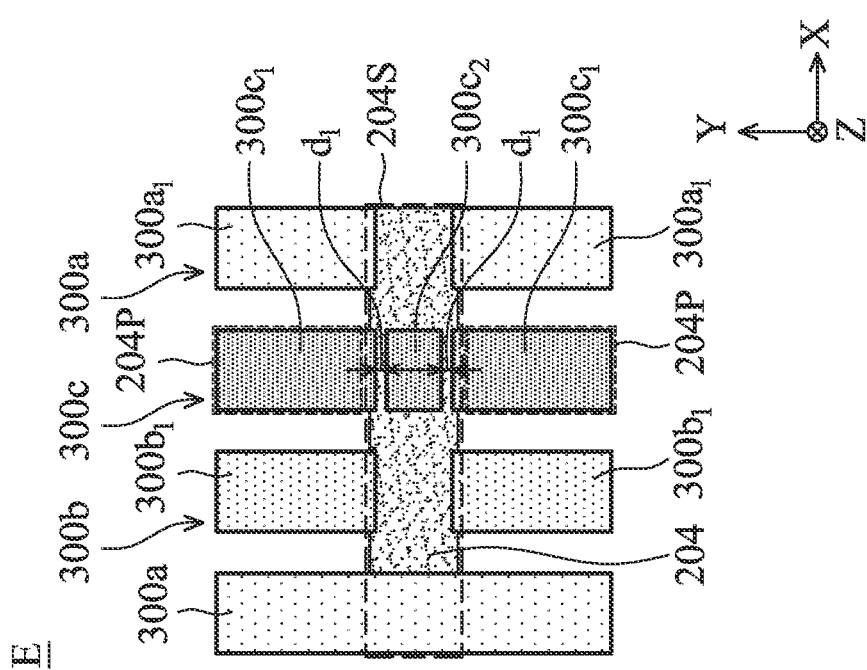

Next, referring to FIG. 4C, in accordance with some embodiments, the color filter unit 300a and the color filter unit 300b may be patterned to have discontinuous portions (separated first portions $300a_1$ and separated first portion $300b_1$), and the second portion $300c_2$ of the color filter unit 300c may not extend or penetrate through the adjacent color filter unit 300a and/or the color filter unit 300b. In this embodiment, no other color filter unit is be disposed between the first portions $300a_1$ of the color filter unit 300a, and no other color filter unit is disposed between the first portions $300b_1$ of the color filter unit 300b.

Next, referring to FIG. 4D, in accordance with some embodiments, the color filter unit 300c may be patterned to have separated first portions $300c_1$, but the second portion $300c_2$ may not be disposed between the two separated first portions $300c_1$. The main spacer 104M (not illustrated) may be in contact with the light-shielding layer 204S between the separated first portions $300c_1$, for example, the main spacer 104M may be in indirect contact with the light-shielding layer 204S through the alignment layer (not illustrated). In other words, in this embodiment, the color filter unit 300c may not have the second portion $300c_2$ having an island-shaped structure.

Figure 4F:
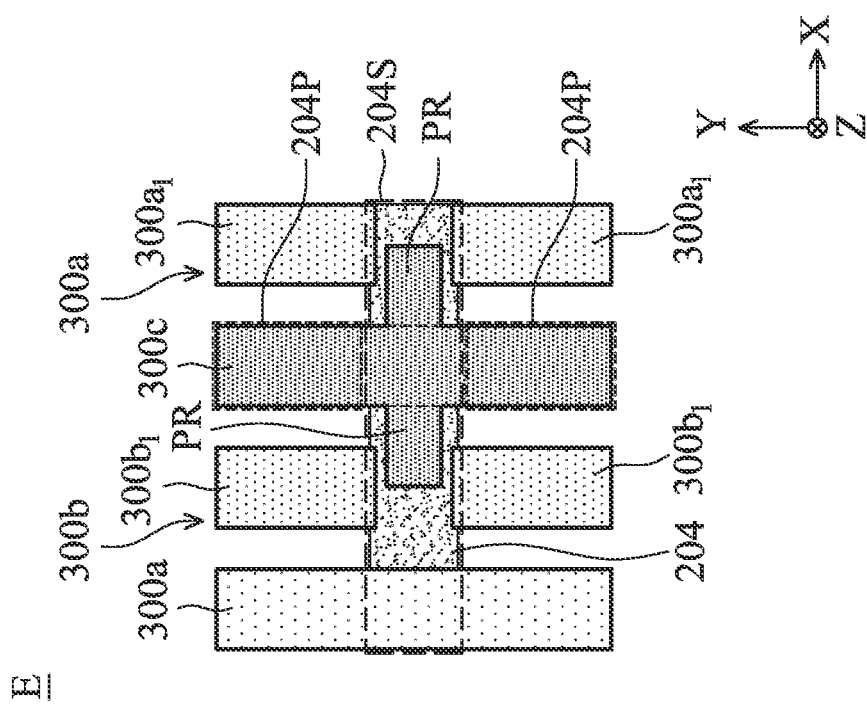
Figure 4E:
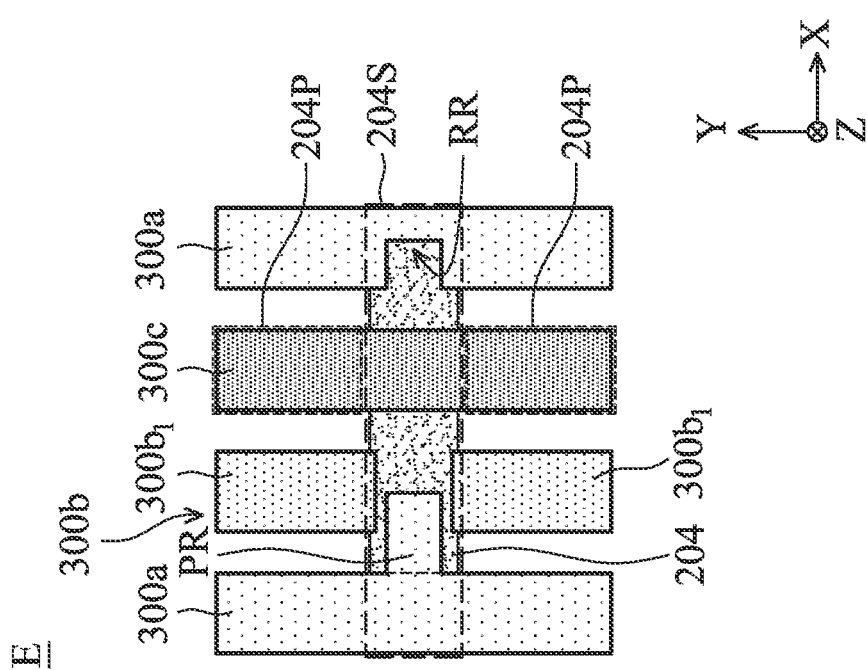

Next, referring to FIG. 4E, in accordance with some embodiments, the color filter unit 300c may not be patterned, and the color filter unit 300a may be patterned to have a recess RR or a protruding portion PR, and the color filter unit 300b may be patterned and may have discontinuous first portions $300b_1$. In this embodiment, the color filter unit 300c may not be patterned, but since the color filter unit 300a and the color filter unit 300b are patterned to be separated or have recesses RR, the color filter unit 300c is not easily to be squeezed to excessively bulge in the Z direction. In accordance with some embodiments, the protruding portion PR of the color filter unit 300a may extend between the first portions $300b_1$ of the adjacent color filter unit 300b. The main spacer (not illustrated) may be in contact with the color filter unit 300c that is overlapped with the light-shielding layer 204S, for example, the main spacer may be in indirect contact with the color filter unit 300c through the alignment layer (not illustrated).

Figure 4G:
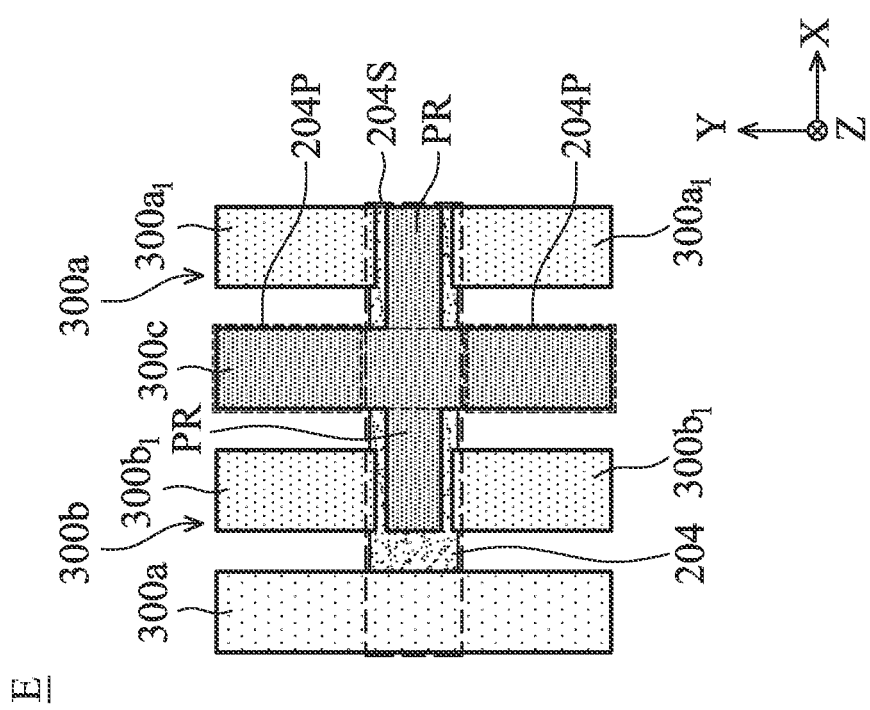

Next, referring to FIG. 4F and FIG. 4G, in accordance with some embodiments, the color filter unit 300c may be patterned to have the protruding portion PR, and the color filter unit 300a and the color filter unit 300b may be patterned to have separated first portions $300a_1$ and separated first portions $300b_1$, respectively. In this embodiment, the protruding portion PR of the color filter unit 300c may extend between the first portions $300a_1$ of adjacent color filter unit 300a, and may extend between the first portions $300b_1$ of adjacent color filter unit 300b. The main spacer (not illustrated) may be in contact with the color filter unit 300c that is overlapped with the light-shielding layer 204S, for example, the main spacer may be in indirect contact with the color filter unit 300c through the alignment layer (not illustrated). The difference between FIG. 4G and FIG. 4F is that the protruding portion PR of the color filter unit 300c in FIG. 4G may be entirely overlapped with the color filter unit 300a and the color filter unit 300b in the Y direction, but the present disclosure is not limited thereto.

To summarize the above, in accordance with some embodiments of the present disclosure, the provided electronic device includes the color filter layer with a patterned design, thereby reducing the height difference between color filter units of different colors. The thickness of the alignment layer that is overlapped with the main spacer can be reduced, thereby reducing the alignment layer being worn by the main spacer and generating debris. In accordance with some embodiments of the present disclosure, the provided electronic device can improve the problems such as brightness unevenness (mura), bright spots or dark shadows of the panel.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
    a first substrate;
    a second substrate disposed opposite to the first substrate;
    a main spacer disposed on the first substrate;
    a sub-spacer disposed on the first substrate and adjacent to the main spacer;
    a light-shielding layer disposed on the second substrate;
    a color filter layer disposed on the second substrate and partially overlapped with the light-shielding layer; and
    an alignment layer disposed on the color filter layer;
    wherein a thickness of the alignment layer that is overlapped with the main spacer is less than a thickness of the alignment layer that is overlapped with the sub-spacer.

2. The electronic device as claimed in claim 1, wherein the color filter layer further comprises a first color filter unit, a second color filter unit, and a third color filter unit, wherein the main spacer is overlapped with the first color filter unit, and the sub-spacer is overlapped with the second color filter unit or the third color filter unit.

3. The electronic device as claimed in claim 2, wherein a height of the first color filter unit is greater than a height of the second color filter unit and a height the third color filter unit.

4. The electronic device as claimed in claim 1, wherein the thickness of the alignment layer that is overlapped with the main spacer is less than 800 angstroms.

5. The electronic device as claimed in claim 1, wherein a top surface of the alignment layer disposed on the color filter layer is substantially flat.

6. The electronic device as claimed in claim 2, wherein neither the sub-spacer nor the main spacer is overlapped with the first color filter unit.

7. The electronic device as claimed in claim 2, wherein the first color filter unit is a blue filter unit.

* * * * *